United States Patent
Radhakrishnan

(10) Patent No.: US 8,694,822 B2
(45) Date of Patent: Apr. 8, 2014

(54) DISASTER RECOVERY IN A NETWORKED COMPUTING ENVIRONMENT

(75) Inventor: Rajesh Radhakrishnan, Reston, VA (US)

(73) Assignee: International Business Machines Corporation, Armonk, NY (US)

( * ) Notice: Subject to any disclaimer, the term of this patent is extended or adjusted under 35 U.S.C. 154(b) by 204 days.

(21) Appl. No.: 12/942,256

(22) Filed: Nov. 9, 2010

(65) Prior Publication Data

US 2012/0117422 A1    May 10, 2012

(51) Int. Cl.
*G06F 11/00*    (2006.01)

(52) U.S. Cl.
USPC ............... 714/6.1; 714/4.1; 714/47.1; 714/42

(58) Field of Classification Search
USPC ................................. 714/2, 4.1, 25
See application file for complete search history.

(56) References Cited

U.S. PATENT DOCUMENTS

| | | |
|---|---|---|
| 7,302,540 B1 | 11/2007 | Holdman et al. |
| 7,631,213 B2 | 12/2009 | Johnson |
| 7,770,057 B1 | 8/2010 | Graham et al. |
| 7,770,058 B2 | 8/2010 | Phan |
| 7,984,151 B1 * | 7/2011 | Raz et al. ................. 709/226 |
| 2002/0023173 A1 * | 2/2002 | Jacobs et al. ................. 709/245 |
| 2005/0193245 A1 | 9/2005 | Hayden et al. |
| 2008/0109804 A1 | 5/2008 | Bloomstein et al. |
| 2008/0209258 A1 | 8/2008 | Casale et al. |
| 2009/0055689 A1 | 2/2009 | Petersen |
| 2009/0113233 A1 | 4/2009 | Phan |
| 2009/0222690 A1 | 9/2009 | Seelig et al. |
| 2010/0077257 A1 | 3/2010 | Burchfield et al. |
| 2010/0107015 A1 * | 4/2010 | Bernabeu-Auban et al. ... 714/38 |
| 2010/0125473 A1 | 5/2010 | Tung et al. |
| 2011/0010518 A1 * | 1/2011 | Kavuri et al. ................. 711/165 |
| 2011/0307735 A1 * | 12/2011 | Greenberg ................. 714/5.1 |

OTHER PUBLICATIONS

Mell et al., "The NIST Definition of Cloud Computing", National Institute of Standards and Technology, Information Technology Laboratory, Version 15, Oct. 7, 2009, 2 pages.
"EVault System Restore", www.i365.com, downloaded Aug. 20, 2010, 1 page. No authors included.
"Amazon Virtual Private Cloud", http://aws.amazon.com/vpc, downloaded Aug. 20, 2010, 4 pages. No authors included.

* cited by examiner

*Primary Examiner* — Sarai Butler
(74) *Attorney, Agent, or Firm* — William E. Schiesser; Maxine L. Barasch; Keohane & D'Alessandro PLLC

(57) ABSTRACT

In general, embodiments of the present invention provide a DR solution for a networked computing environment such as a cloud computing environment. Specifically, a customer or the like can select a disaster recovery provider from a pool (at least one) of disaster recovery providers using a customer interface to a DR portal. Similarly, using the interface and DR portal, the customer can then submit a request for DR to be performed for a set (at least one) of applications. The customer will then also submit (via the interface and DR portal) DR information. This information can include, among other things, a set of application images, a set of application files, a set of recovery requirements, a designation of one or more specific (e.g., application) components for which DR is desired, dump file(s), database file(s), etc. Using the DR information, the DR provider will then generate and conduct a set of DR tests and provide the results to the customer via the DR portal and interface. In one embodiment, a temporary DR environment can be created (e.g., by the DR provider or the customer) in which the DR tests are conducted.

19 Claims, 5 Drawing Sheets

DISASTER RECOVERY IN A NETWORKED COMPUTING ENVIRONMENT

TECHNICAL FIELD

The present invention generally relates to Disaster Recovery (DR). Specifically, the present invention relates to component-based DR in a networked computing (e.g., cloud computing) environment.

BACKGROUND

The cloud computing environment is an enhancement to the predecessor grid environment, whereby multiple grids and other computation resources may be further abstracted by a cloud layer, thus making disparate devices appear to an end-consumer as a single pool of seamless resources. These resources may include such things as physical or logical compute engines, servers and devices, device memory, and storage devices.

Currently, Disaster Recovery (DR) tests are relatively inefficient and cumbersome to perform. Along these lines, DR tests per service often fail DR threshold requirements such as service Recovery Time Objective (RTO), component RTO, data RTO, and Recovery Point Objective (RPO). As such, it is difficult to gauge the success rate of DR tests and DR performance during actual disasters. In general, DR exercises range from table top exercises, and in-lab partial recovery tests, to full scale DR site recovery tests. Currently, availability of DR tests that allow for automated third party recovery tests that focus on specific services and service components is very limited. Given the larger portfolio of Information Technology (IT) enabled business services that large enterprises have and their interdependencies, it is difficult and costly to run full scale DR drills on a periodic basis. Moreover, the portfolio of Service Oriented Architecture (SOA)/Web services (e.g., atomic composite, and clustered services) and their relationship to business services and business processes introduce more complexity to DR scenarios and exercises.

SUMMARY

In general, embodiments of the present invention provide a DR solution for a networked computing environment such as a cloud computing environment. Specifically, a customer or the like can select a disaster recovery provider from a pool (at least one) of disaster recovery providers using a customer interface to a DR portal. Similarly, using the interface and DR portal, the customer can then submit a request for DR to be performed for a set (at least one) of applications. The customer will then also submit (via the interface and DR portal) DR information. This information can include, among other things, a set of application images, a set of application files, a set of recovery requirements, a designation of one or more specific (e.g., application) components for which DR is desired, dump file(s), database file(s), etc. Using the DR information, the DR provider will then generate and conduct a set of DR tests and provide the results to the customer via the DR portal and interface. In one embodiment, a temporary DR environment can be created (e.g., by the DR provider or the customer) in which the DR tests are conducted.

A first aspect of the present invention provides a method for providing disaster recovery in a networked computing environment, comprising: receiving a selection of a disaster recovery provider from a customer, the selection being made from a pool of disaster recovery providers; receiving a request from the customer for disaster recovery to be performed for a set of applications; receiving disaster recovery information from the customer pertaining to the request, the disaster recovery information comprising at least one of the following: a set of application images, a set of application files, and a set of recovery requirements; providing the disaster recovery information to the disaster recovery provider; and receiving results of a set of disaster recovery tests conducted by the disaster recovery provider in response to the request, the set of disaster recovery tests being developed based on the disaster recovery information.

A second aspect of the present invention provides a system for providing disaster recovery in a networked computing environment, comprising: a bus; a processor coupled to the bus; and a memory medium coupled to the bus, the memory medium comprising instructions to: receive a selection of a disaster recovery provider from a customer, the selection being made from a pool of disaster recovery providers; receive a request from the customer for disaster recovery to be performed for a set of applications; receive disaster recovery information from the customer pertaining to the request, the disaster recovery information comprising at least one of the following: a set of application images, a set of application files, and a set of recovery requirements; provide the disaster recovery information to the disaster recovery provider; and receive results of a set of disaster recovery tests conducted by the disaster recovery provider in response to the request, the set of disaster recovery tests being developed based on the disaster recovery information.

A third aspect of the present invention provides a computer program product for providing disaster recovery in a networked computing environment, the computer program product comprising a computer readable storage media, and program instructions stored on the computer readable storage media, to: receive a selection of a disaster recovery provider from a customer, the selection being made from a pool of disaster recovery providers; receive a request from the customer for disaster recovery to be performed for a set of applications; receive disaster recovery information from the customer pertaining to the request, the disaster recovery information comprising at least one of the following: a set of application images, a set of application files, and a set of recovery requirements; provide the disaster recovery information to the disaster recovery provider; and receive results of a set of disaster recovery tests conducted by the disaster recovery provider in response to the request, the set of disaster recovery tests being developed based on the disaster recovery information.

A fourth aspect of the present invention provides a method for deploying a system for providing disaster recovery in a networked computing environment, comprising: deploying a computer infrastructure being operable to: receive a selection of a disaster recovery provider from a customer, the selection being made from a pool of disaster recovery providers; receive a request from the customer for disaster recovery to be performed for a set of applications; receive disaster recovery information from the customer pertaining to the request, the disaster recovery information comprising at least one of the following: a set of application images, a set of application files, and a set of recovery requirements; provide the disaster recovery information to the disaster recovery provider; and receive results of a set of disaster recovery tests conducted by the disaster recovery provider in response to the request, the set of disaster recovery tests being developed based on the disaster recovery information.

BRIEF DESCRIPTION OF THE DRAWINGS

These and other features of this invention will be more readily understood from the following detailed description of the various aspects of the invention taken in conjunction with the accompanying drawings in which.

Figure 1:
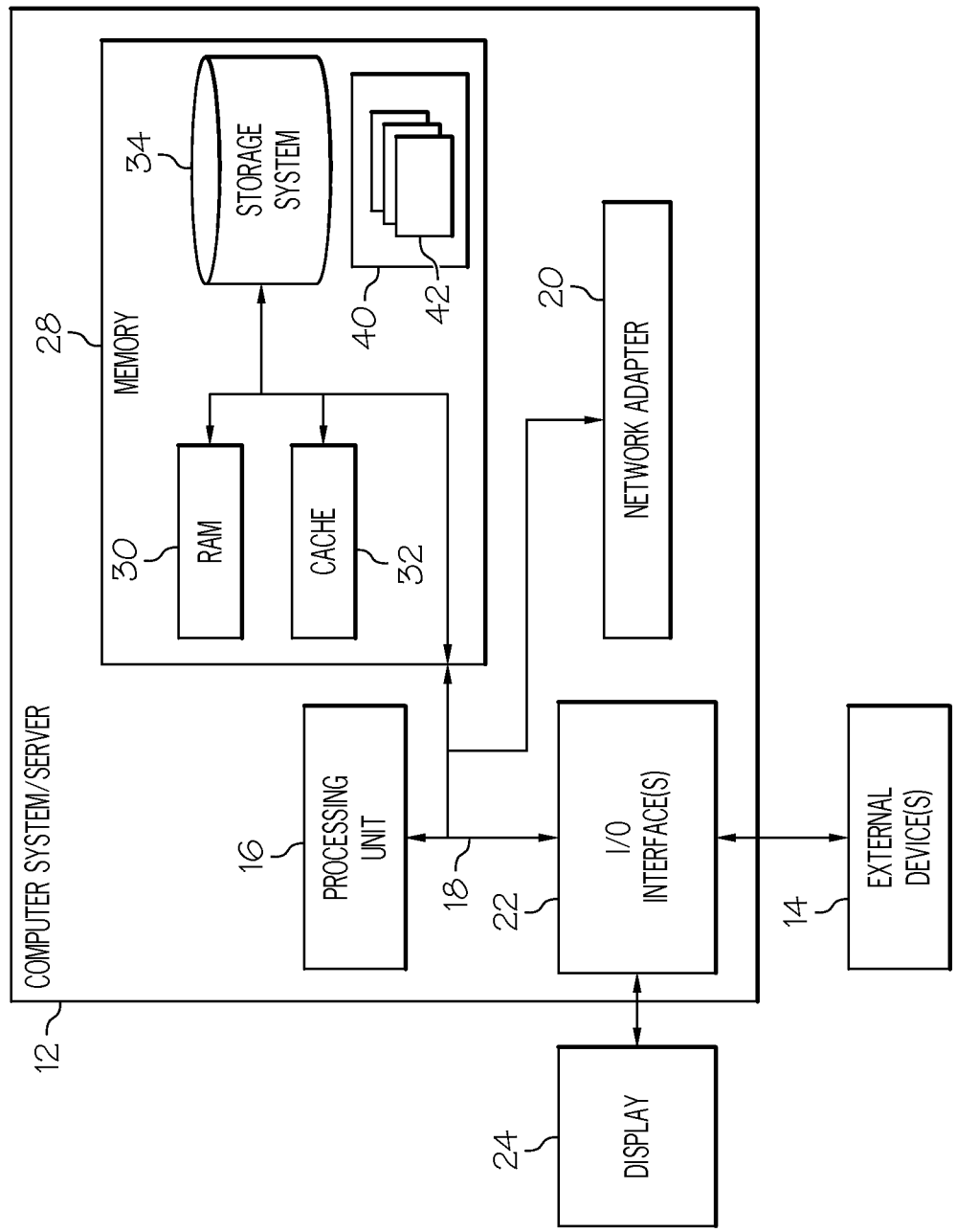
FIG. 1 depicts a cloud computing node according to an embodiment of the present invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION

Illustrative embodiments now will be described more fully herein with reference to the accompanying drawings, in which exemplary embodiments are shown. This disclosure may, however, be embodied in many different forms and should not be construed as limited to the exemplary embodiments set forth herein. Rather, these exemplary embodiments are provided so that this disclosure will be thorough and complete and will fully convey the scope of this disclosure to those skilled in the art. In the description, details of well-known features and techniques may be omitted to avoid unnecessarily obscuring the presented embodiments.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

In general, embodiments of the present invention provide a DR solution for a networked computing environment such as a cloud computing environment. Specifically, a customer or the like can select a disaster recovery provider from a pool (at least one) of disaster recovery providers using a customer interface to a DR portal. Similarly, using the interface and DR portal, the customer can then submit a request for DR to be performed for a set (at least one) of applications. The customer will then also submit (via the interface and DR portal) DR information. This information can include, among other things, a set of application images, a set of application files, a set of recovery requirements, a designation of one or more specific (e.g., application) components for which DR is desired, dump file(s), database file(s), etc. Using the DR information, the DR provider will then generate and conduct a set of DR tests and provide the results to the customer via the DR portal and interface. In one embodiment, a temporary DR environment can be created (e.g., by the DR provider or the customer) in which the DR tests are conducted.

It is understood in advance that although this disclosure includes a detailed description of cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed, automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active consumer accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited consumer-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application-hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10, there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program code embodied on a computer readable medium may be transmitted using any appropriate medium including, but not limited to, wireless, wireline, optical fiber cable, radio-frequency (RF), etc., or any suitable combination of the foregoing.

Disaster recovery program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a consumer to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
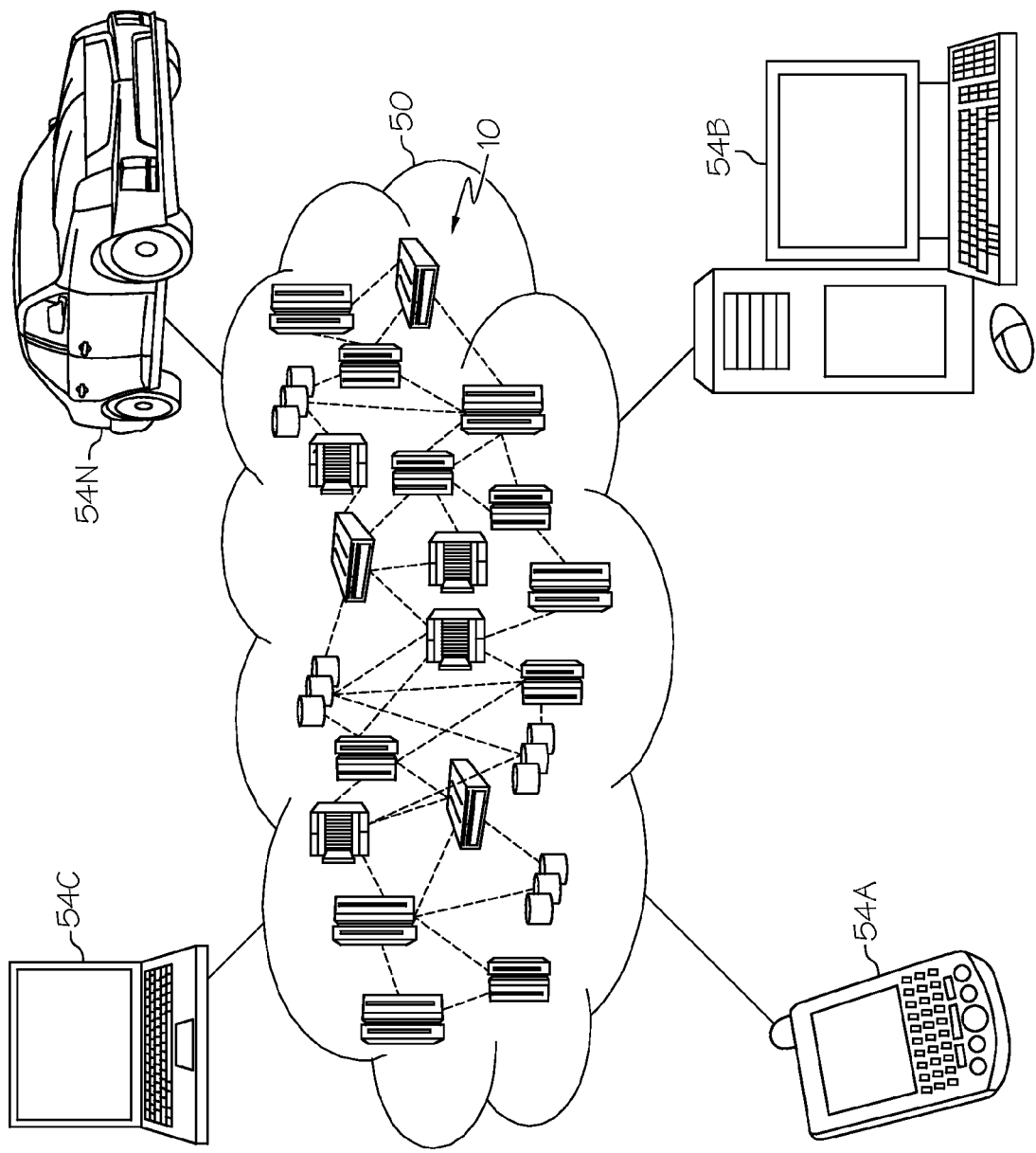
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as private, community, public, or hybrid clouds as described hereinabove, or a combination thereof. This allows cloud computing environment 50 to offer infrastructure, platforms, and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
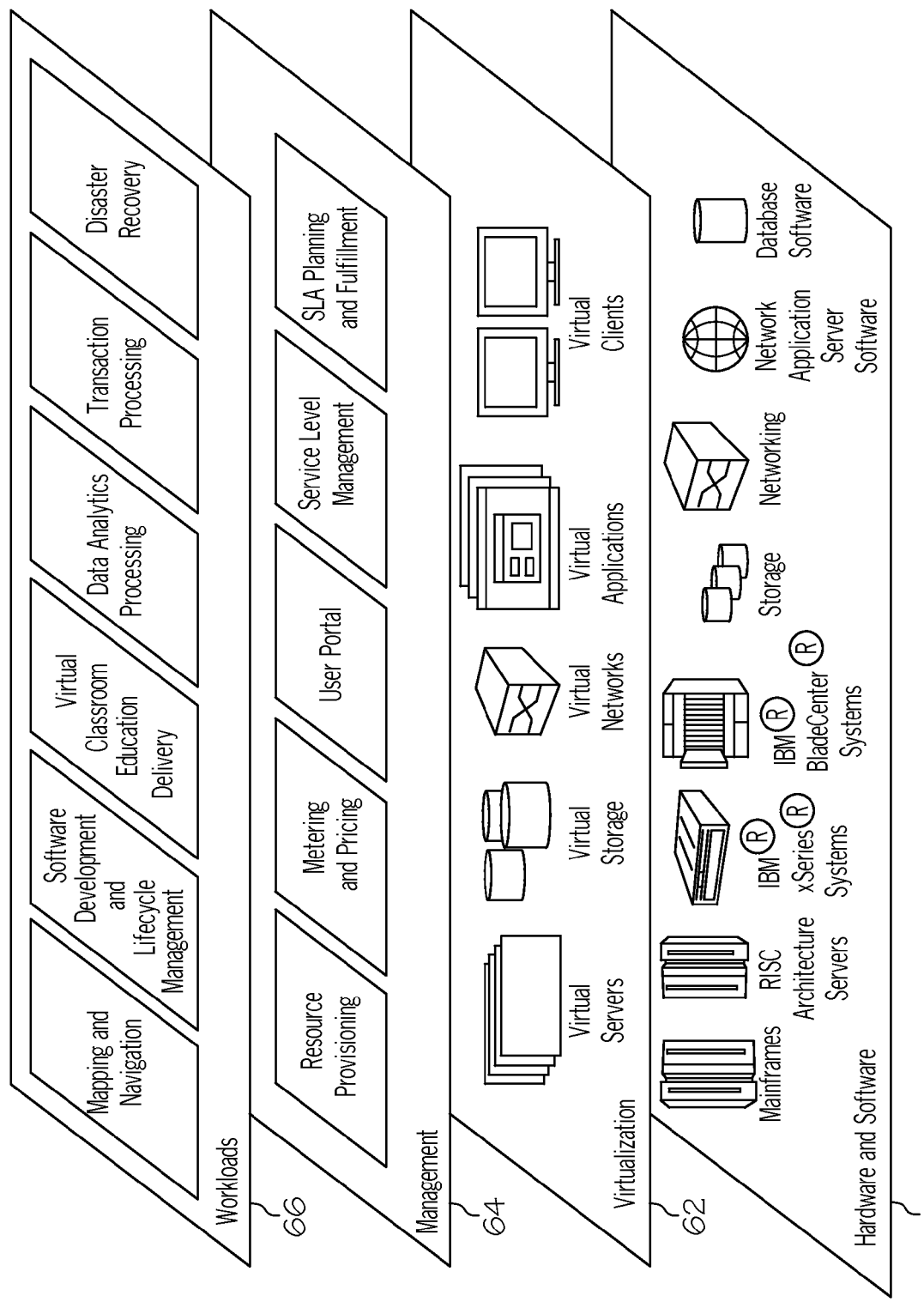
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes. In one example, IBM® zSeries® systems and RISC (Reduced Instruction Set Computer) architecture based servers. In one example, IBM pSeries® systems, IBM xSeries® systems, IBM BladeCenter® systems, storage devices, networks, and networking components. Examples of software components include network application server software. In one example, IBM WebSphere® application server software and database software. In one example, IBM DB2® database software. (IBM, zSeries, pSeries, xSeries, BladeCenter, WebSphere, and DB2 are trademarks of International Business Machines Corporation registered in many jurisdictions worldwide.)

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. Consumer portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and disaster recover. As mentioned above, all of the foregoing examples described with respect to FIG. 3 are illustrative only, and the invention is not limited to these examples.

It is understood all functions of the present invention as described herein are typically performed by the disaster recover function, which can be tangibly embodied as modules of program code 42 of disaster program/utility 40 (FIG. 1). However, this need not be the case. Rather, the functionality recited herein could be carried out/implemented and/or enabled by any of the layers 60-66 shown in FIG. 3.

It is reiterated that although this disclosure includes a detailed description on cloud computing, implementation of the teachings recited herein are not limited to a cloud computing environment. Rather, the embodiments of the present invention are intended to be implemented with any type of networked computing environment now known or later developed.

Figure 4:
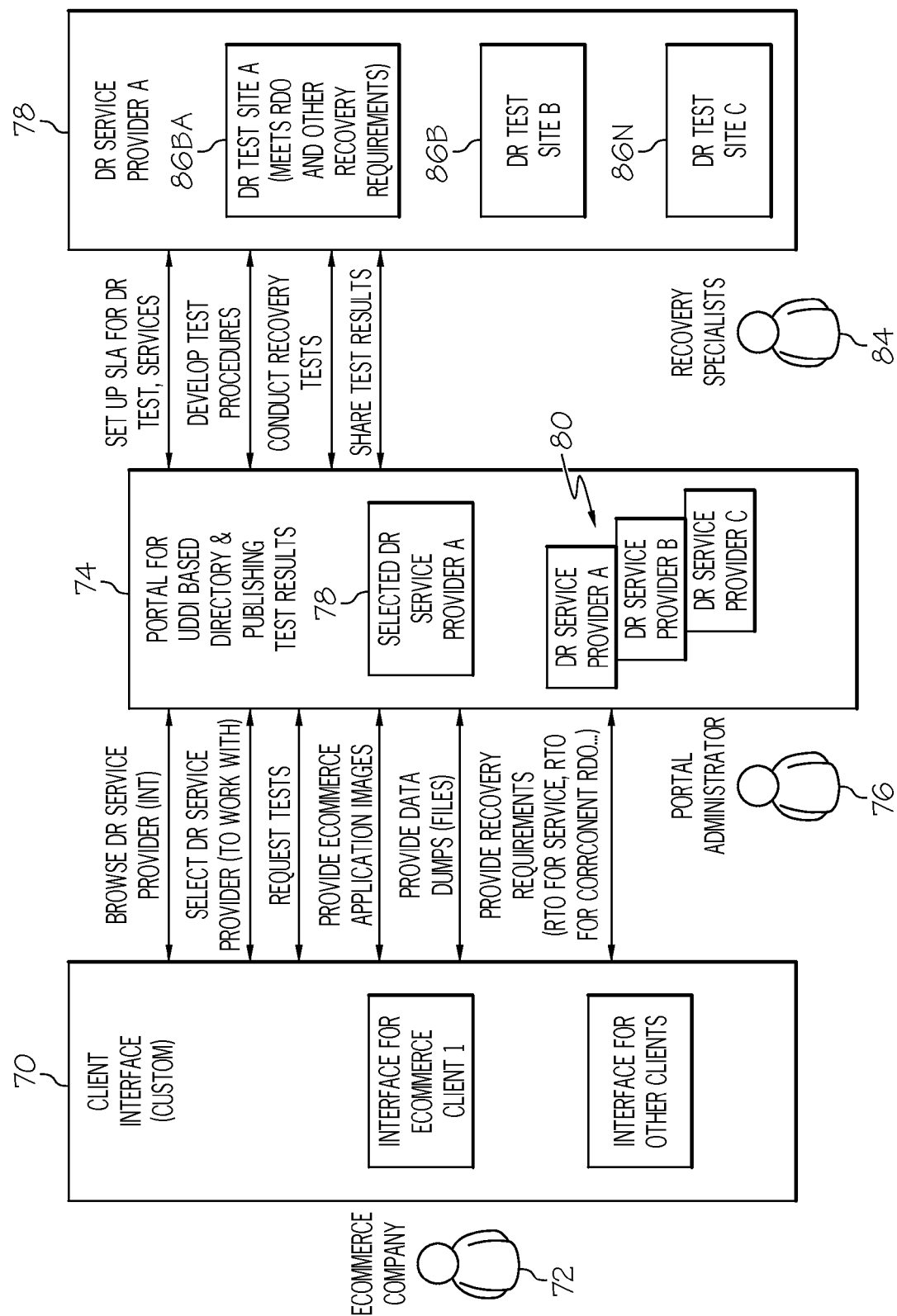
FIG. 4 depicts a component flow diagram according to an embodiment of the present invention.

Referring now to FIG. 4, a component flow diagram according to at least one embodiment of the present invention is shown. As depicted, FIG. 4 shows a customer interface 70 operated by a customer/client 72 (e.g., an e-commerce company), a DR portal 74 (e.g., a Universal Description, Discovery, and Information (UDDI) portal) operated by a portal administrator 76 or the like, and a DR Service provider 78 operated by recovery specialists 84 or the like. In general, each customer/client can have their own custom interface (e.g., customized according to their business and/or personal needs). In general, the customer 72 will browse a DR (service) provider pool/database 80 via DR portal 74 using interface 70, and select a DR provider 78 that best suits the customer 70's needs. DR providers 80 are typically contracted using Service Level Agreements (SLAs) or the like that delineate terms of services (e.g., obligations and compensation). Once a provider is selected, customer 72 will then request DR operations and/or testing to be performed for a set (e.g., at least one) of applications (or component(s) thereof). In addition, customer 72 will also provide DR information for the DR tests to be generated and conducted. DR information can include at least one of the following: a set of application images, a set of application files, a set of recovery requirements, a designation by the customer of at least one specific component for which disaster recovery is needed, a copy of a set of databases associated with the set of applications; and/or at least one dump file associated with the set of applications.

The request and DR information will be routed by DR portal 74 to the selected DR provider 78 who has the capability of generating and conducting DR tests based on the request and DR information in a (e.g., temporary) DR test environment 86A-N. In a typical embodiment, a DR test site 86A that can best conduct the DR tests will be selected and/or created by DR provider 78. Regardless, DR provider 78 will create and conduct a set of DR tests necessary to provide the requested DR in accordance with the DR information. DR test results will then be communicated back to customer 72 via DR portal 74 and interface 70. In a typical embodiment, the DR tests (cases) can be basic unit and functional tests associated with the recovered application/service component or group of components. In other words, it is determined whether the application or component is functioning as expected in the temporary test environment. The DR tests themselves can vary by customer and component, and can be part of the requirement/information provided by the customer and internally tested by the DR provider and later tested by the customers themselves.

Figure 5:
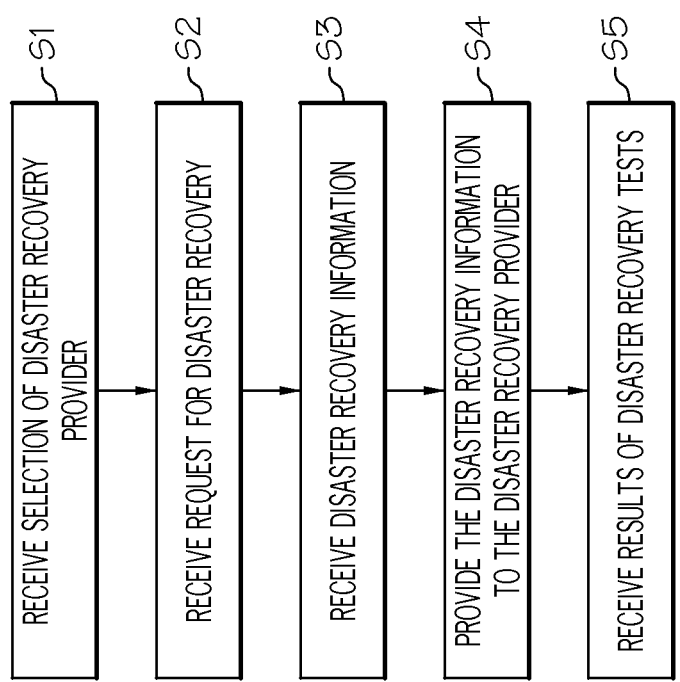
FIG. 5 depicts a method flow diagram according to an embodiment of the repent invention.

Referring now to FIG. 5, an illustrative method flow diagram according to an embodiment of the present invention is shown. In step S1, a selection of a DR provider is received from a customer. As indicated above, the selection is made from a pool of DR providers. In step S2, a request is received from the customer for DR to be performed for a set of applications. In step S3, DR information is received from the customer pertaining to the request. DR information can include at least one of the following: a set of application images, a set of application files, a set of recovery requirements, a designation by the customer of at least one specific component for which disaster recovery is needed, a copy of a set of databases associated with the set of applications, and/or at least one dump file associated with the set of applications. In step S4, the DR information is provided to the DR provider, who will then generate and conduct a set of DR tests based thereon. In step S5, results of the set of DR tests conducted by the DR provider in response to the request are received by the customer via the DR portal.

While shown and described herein as a disaster recovery solution, it is understood that the invention further provides various alternative embodiments. For example, in one embodiment, the invention provides a computer-readable/useable storage medium that includes computer program code to enable a computer infrastructure to provide disaster recovery functionality as discussed herein. To this extent, the computer-readable/useable storage medium includes program code that implements each of the various processes of the invention. It is understood that the terms computer-readable storage medium or computer-useable storage medium comprise one or more of any type of physical embodiment of the program code. In particular, the computer-readable/useable storage medium can comprise program code embodied on one or more portable storage articles of manufacture (e.g., a compact disc, a magnetic disk, a tape, etc.), on one or more data storage portions of a computing device, such as memory 28 (FIG. 1) and/or storage system 34 (FIG. 1) (e.g., a fixed disk, a read-only memory, a random access memory, a cache memory, etc.).

In another embodiment, the invention provides a method that performs the process of the invention on a subscription, advertising, and/or fee basis. That is, a service provider, such as a Solution Integrator, could offer to provide disaster recovery functionality. In this case, the service provider can create, maintain, support, etc., a computer infrastructure, such as computer system 12 (FIG. 1) that performs the processes of the invention for one or more consumers. In return, the service provider can receive payment from the consumer(s) under a subscription and/or fee agreement and/or the service provider can receive payment from the sale of advertising content to one or more third parties.

In still another embodiment, the invention provides a computer-implemented method for disaster recovery. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: installing program code on a computing device, such as computer system 12 (FIG. 1), from a computer-readable medium; adding one or more computing devices to the computer infrastructure; and incorporating and/or modifying one or more existing systems of the computer infrastructure to enable the computer infrastructure to perform the processes of the invention.

As used herein, it is understood that the terms "program code" and "computer program code" are synonymous and mean any expression, in any language, code, or notation, of a set of instructions intended to cause a computing device having an information processing capability to perform a particular function either directly or after either or both of the following: (a) conversion to another language, code, or notation; and/or (b) reproduction in a different material form. To this extent, program code can be embodied as one or more of: an application/software program, component software/a library of functions, an operating system, a basic device system/driver for a particular computing device, and the like.

A data processing system suitable for storing and/or executing program code can be provided hereunder and can include at least one processor communicatively coupled, directly or indirectly, to memory elements through a system bus. The memory elements can include, but are not limited to, local memory employed during actual execution of the program code, bulk storage, and cache memories that provide temporary storage of at least some program code in order to reduce the number of times code must be retrieved from bulk storage during execution. Input/output and/or other external devices (including, but not limited to, keyboards, displays, pointing devices, etc.) can be coupled to the system either directly or through intervening device controllers.

Network adapters also may be coupled to the system to enable the data processing system to become coupled to other data processing systems, remote printers, storage devices, and/or the like, through any combination of intervening private or public networks. Illustrative network adapters include, but are not limited to, modems, cable modems, and Ethernet cards.

The foregoing description of various aspects of the invention has been presented for purposes of illustration and description. It is not intended to be exhaustive or to limit the invention to the precise form disclosed and, obviously, many modifications and variations are possible. Such modifications and variations that may be apparent to a person skilled in the art are intended to be included within the scope of the invention as defined by the accompanying claims.

What is claimed is:

1. A method for providing disaster recovery in a networked cloud computing environment, comprising:
   receiving, at a portal, a selection of a first disaster recovery provider from a first customer through a first user interface, the selection being made from a pool of disaster recovery providers, the first user interface being customized for the first customer according to business or personal needs of the first customer;
   receiving, at the portal, a request from the first customer, through the first user interface, for disaster recovery to be performed for a set of applications;
   receiving, at the portal, first disaster recovery information pertaining to the request from the first customer through the first user interface, the first disaster recovery information comprising at least one of the following: a set of application images, a set of application files, and a set of recovery requirements;
   providing, by the portal, the first disaster recovery information to the first disaster recovery provider;
   selecting, by the first disaster recovery provider, a test site that can best conduct a first set of disaster recovery tests;

receiving at the portal, from the first disaster recovery provider, results of the first set of disaster recovery tests conducted by the first disaster recovery provider in response to the first request, the first set of disaster recovery tests being developed based on the first disaster recovery information;

providing, by the portal, the results of the first set of disaster recovery tests to the first customer through the first user interface;

receiving, at the portal, a selection of a second disaster recovery provider from a second customer through a second user interface, the selection being made from the pool of disaster recovery providers, the second user interface being customized for the second customer according to business or personal needs of the second customer;

receiving, at the portal, a second request from the second customer, through the second user interface, for disaster recovery to be performed for a second set of applications;

receiving, at the portal, second disaster recovery information pertaining to the second request from the second customer through the second user interface, the second disaster recovery information comprising at least one of the following: a set of application images, a set of application files, and a set of recovery requirements;

providing, by the portal, the second disaster recovery information to the second disaster recovery provider;

selecting, by the second disaster recovery provider, a test site that can best conduct a second set of disaster recovery tests;

receiving at the portal, from the second disaster recovery provider, results of the second set of disaster recovery tests conducted by the second disaster recovery provider in response to the second request, the second set of disaster recovery tests being developed based on the second disaster recovery information; and providing, by the portal, the results of the second set of disaster recovery tests to the second customer through the second user interface.

2. The method of claim 1, the networked computing environment being a cloud computing environment.

3. The method of claim 1, the first disaster recovery information further comprising a designation by the first customer of at least one specific component for which disaster recovery is needed, and the second disaster recovery information further comprising a designation by the second customer of at least one specific component for which disaster recovery is needed.

4. The method of claim 1, the first disaster recovery information further comprising:
a copy of a set of databases associated with the first set of applications; or
at least one dump file associated with the first set of applications.

5. The method of claim 4, further comprising the first disaster recovery provider developing the first set of disaster recovery tests using the first disaster recovery information, and the second disaster recovery provider developing the second set of disaster recovery tests using the second disaster recovery information.

6. The method of claim 1, further comprising creating, by the first disaster recovery provider, a first temporary disaster recovery environment, the first set of disaster recovery tests being conducted within the first temporary disaster recovery environment, and creating, by the second disaster recovery provider, a second temporary disaster recovery environment, the second set of disaster recovery tests being conducted within the second temporary disaster recovery environment.

7. A system for providing disaster recovery in a networked computing environment, comprising:
a bus;
a processor coupled to the bus; and
a memory medium coupled to the bus, the memory medium comprising instructions to:
receive, at a portal, a selection of a first disaster recovery provider from a first customer through a first user interface, the selection being made from a pool of disaster recovery providers, the first user interface being customized for the first customer according to business or personal needs of the first customer;
receive, at the portal, a request from the first customer, through the first user interface, for disaster recovery to be performed for a set of applications;
receive, at the portal, first disaster recovery information pertaining to the request from the first customer through the first user interface, the first disaster recovery information comprising at least one of the following: a set of application images, a set of application files, and a set of recovery requirements;
provide, by the portal, the first disaster recovery information to the first disaster recovery provider;
select, by the first disaster recovery provider, a test site that can best conduct a first set of disaster recovery tests;
receive at the portal, from the first disaster recovery provider, results of the first set of disaster recovery tests conducted by the first disaster recovery provider in response to the first request, the first set of disaster recovery tests being developed based on the first disaster recovery information;
provide, by the portal, the results of the first set of disaster recovery tests to the first customer through the first user interface;
receive, at the portal, a selection of a second disaster recovery provider from a second customer through a second user interface, the selection being made from the pool of disaster recovery providers, the second user interface being customized for the second customer according to business or personal needs of the second customer;
receive, at the portal, a second request from the second customer, through the second user interface, for disaster recovery to be performed for a second set of applications;
receive, at the portal, second disaster recovery information pertaining to the second request from the second customer through the second user interface, the second disaster recovery information comprising at least one of the following: a set of application images, a set of application files, and a set of recovery requirements;
provide, by the portal, the second disaster recovery information to the second disaster recovery provider;
select, by the second disaster recovery provider, a test site that can best conduct a second set of disaster recovery tests;
receive at the portal, from the second disaster recovery provider, results of the second set of disaster recovery tests conducted by the second disaster recovery provider in response to the second request, the second set of disaster recovery tests being developed based on the second disaster recovery information; and
provide, by the portal, the results of the second set of disaster recovery tests to the second customer through the second user interface.

8. The system of claim 7, the networked computing environment being a cloud computing environment.

9. The system of claim 7, the first disaster recovery information further comprising a designation by the first customer of at least one specific component for which disaster recovery is needed, and the second disaster recovery information further comprising a designation by the second customer of at least one specific component for which disaster recovery is needed.

10. The system of claim 7, the first disaster recovery information further comprising:
   a copy of a set of databases associated with the first set of applications; or
   at least one dump file associated with the first set of applications.

11. The system of claim 10, the memory medium further comprising instructions to develop the first set of disaster recovery tests using the first disaster recovery information and develop the second set of disaster recovery tests using the second disaster recovery information.

12. The system of claim 7, the memory medium further comprising instructions to create, by the first disaster recovery provider, a first temporary disaster recovery environment, the first set of disaster recovery tests being conducted within the first temporary disaster recovery environment, and create, by the second disaster recovery provider, a second temporary disaster recovery environment, the second set of disaster recovery tests being conducted within the second temporary disaster recovery environment.

13. A computer program product for providing disaster recovery in a networked computing environment, the computer program product comprising a non-transitory computer readable storage medium, and program instructions stored on the non-transitory computer readable storage medium, to:
   receiving, at a portal, a selection of a first disaster recovery provider from a first customer through a first user interface, the selection being made from a pool of disaster recovery providers, the first user interface being customized for the first customer according to business or personal needs of the first customer;
   receive, at the portal, a request from the first customer, through the first user interface, for disaster recovery to be performed for a set of applications;
   receive, at the portal, first disaster recovery information pertaining to the request from the first customer through the first user interface, the first disaster recovery information comprising at least one of the following: a set of application images, a set of application files, and a set of recovery requirements;
   provide, by the portal, the first disaster recovery information to the first disaster recovery provider;
   select, by the first disaster recovery provider, a test site that can best conduct a first set of disaster recovery tests;
   receive at the portal, from the first disaster recovery provider, results of the first set of disaster recovery tests conducted by the first disaster recovery provider in response to the first request, the first set of disaster recovery tests being developed based on the first disaster recovery information;
   provide, by the portal, the results of the first set of disaster recovery tests to the first customer through the first user interface;
   receive, at the portal, a selection of a second disaster recovery provider from a second customer through a second user interface, the selection being made from the pool of disaster recovery providers, the second user interface being customized for the second customer according to business or personal needs of the second customer;
   receive, at the portal, a second request from the second customer, through the second user interface, for disaster recovery to be performed for a second set of applications;
   receive, at the portal, second disaster recovery information pertaining to the second request from the second customer through the second user interface, the second disaster recovery information comprising at least one of the following: a set of application images, a set of application files, and a set of recovery requirements;
   provide, by the portal, the second disaster recovery information to the second disaster recovery provider;
   select, by the second disaster recovery provider, a test site that can best conduct a second set of disaster recovery tests;
   receive at the portal, from the second disaster recovery provider, results of the second set of disaster recovery tests conducted by the second disaster recovery provider in response to the second request, the second set of disaster recovery tests being developed based on the second disaster recovery information; and
   provide, by the portal, the results of the second set of disaster recovery tests to the second customer through the second user interface.

14. The computer program product of claim 13, the networked computing environment being a cloud computing environment.

15. The computer program product of claim 13, the first disaster recovery information further comprising a designation by the first customer of at least one specific component for which disaster recovery is needed, and the second disaster recovery information further comprising a designation by the second customer of at least one specific component for which disaster recovery is needed.

16. The computer program product of claim 13, the first disaster recovery information further comprising:
   a copy of a set of databases associated with the first set of applications; or
   at least one dump file associated with the first set of applications.

17. The computer program product of claim 16, further comprising program instructions stored on the non-transitory computer readable storage medium to develop the first set of disaster recovery tests using the first disaster recovery information and develop the second set of disaster recovery tests using the second disaster recovery information.

18. The computer program product of claim 13, further comprising program instructions stored on the non-transitory computer readable storage medium to create, by the first disaster recovery provider, a first temporary disaster recovery environment, the first set of disaster recovery tests being conducted within the first temporary disaster recovery environment, and create, by the second disaster recovery provider, a second temporary disaster recovery environment, the second set of disaster recovery tests being conducted within the second temporary disaster recovery environment.

19. A method for deploying a system for providing disaster recovery in a networked computing environment, comprising:
   deploying a computer infrastructure being operable to:
      receive, at a portal, a selection of a first disaster recovery provider from a first customer through a first user interface, the selection being made from a pool of disaster recovery providers, the first user interface being customized for the first customer according to business or personal needs of the first customer;

receive, at the portal, a request from the first customer, through the first user interface, for disaster recovery to be performed for a set of applications;

receive, at the portal, first disaster recovery information pertaining to the request from the first customer through the first user interface, the first disaster recovery information comprising at least one of the following: a set of application images, a set of application files, and a set of recovery requirements;

provide, by the portal, the first disaster recovery information to the first disaster recovery provider;

select, by the first disaster recovery provider, a test site that can best conduct a first set of disaster recovery tests;

receive at the portal, from the first disaster recovery provider, results of the first set of disaster recovery tests conducted by the first disaster recovery provider in response to the first request, the first set of disaster recovery tests being developed based on the first disaster recovery information;

provide, by the portal, the results of the first set of disaster recovery tests to the first customer through the first user interface;

receive, at the portal, a selection of a second disaster recovery provider from a second customer through a second user interface, the selection being made from the pool of disaster recovery providers, the second user interface being customized for the second customer according to business or personal needs of the second customer;

receive, at the portal, a second request from the second customer, through the second user interface, for disaster recovery to be performed for a second set of applications;

receive, at the portal, second disaster recovery information pertaining to the second request from the second customer through the second user interface, the second disaster recovery information comprising at least one of the following: a set of application images, a set of application files, and a set of recovery requirements;

provide, by the portal, the second disaster recovery information to the second disaster recovery provider;

select, by the second disaster recovery provider, a test site that can best conduct a second set of disaster recovery tests;

receive at the portal, from the second disaster recovery provider, results of the second set of disaster recovery tests conducted by the second disaster recovery provider in response to the second request, the second set of disaster recovery tests being developed based on the second disaster recovery information; and provide, by the portal, the results of the second set of disaster recovery tests to the second customer through the second user interface.

* * * * *